United States Patent
Chen

[19]

[11] Patent Number: 6,019,122
[45] Date of Patent: Feb. 1, 2000

[54] MEMBRANE-TYPE INFLATION NOZZLE

[76] Inventor: David Chen, No. 140, Hsin-Ma Rd., Suao Town, Ilan County, Taiwan

[21] Appl. No.: 09/246,154

[22] Filed: Feb. 8, 1999

[51] Int. Cl.$^7$ .................................................... F16K 15/20
[52] U.S. Cl. .......................... 137/223; 137/246; 137/846; 137/522
[58] Field of Search .................................. 137/844, 846, 137/847, 223, 246, 522; 446/224

[56] References Cited

U.S. PATENT DOCUMENTS

| | | | |
|---|---|---|---|
| 4,842,007 | 6/1989 | Kurtz | 137/223 |
| 4,917,646 | 4/1990 | Kieves | 446/224 |
| 5,108,339 | 4/1992 | Kieves | 446/224 X |
| 5,336,123 | 8/1994 | Laske et al. | 446/224 |
| 5,451,179 | 9/1995 | LaRoi, Jr. et al. | 446/224 |
| 5,830,780 | 11/1998 | Dennison et al. | 446/224 X |
| 5,860,441 | 1/1999 | Garcia | 137/223 X |

*Primary Examiner*—John Rivell
*Assistant Examiner*—Meredith H. Schoenfeld
*Attorney, Agent, or Firm*—Dougherty & Troxell

[57] ABSTRACT

A membrane-type inflation nozzle applicable to an inflatable envelope. A release sheet is disposed between two nozzle membranes at an opening of the nozzle. An adhesive material is disposed between inner membrane walls of the opening of the nozzle. One end of the release sheet is positioned between the adhesive material and the other membrane wall. The other end of the release sheet extends out of the opening. When inflating the envelope, the release sheet is torn away from the nozzle opening and then the envelope is fully inflated. Therefore, an internal pressure of the envelope makes the nozzle self-close. In addition, the adhesive material at the nozzle opening is able to adhere corresponding inner membrane walls to each other so as to achieve a more tightly air-sealing effect.

24 Claims, 11 Drawing Sheets

MEMBRANE-TYPE INFLATION NOZZLE

BACKGROUND OF THE INVENTION

The present invention relates to a membrane-type inflation nozzle applicable to an inflatable envelope. A release sheet is detachably disposed between two inner membrane walls of an opening of the nozzle. By means of the release sheet, the manufacturing of the inflation nozzle is facilitated. Moreover, a more tightly air-sealing effect for the inflatable envelope can be achieved.

A conventional inflatable envelope is equipped with a self-closing inflation nozzle structure. Such inflation nozzle is composed of two nozzle membranes which are seamed with an edge of the envelope and inward extend. The edges of the two nozzle membranes are fused to define therebetween an air passage. After inflated, the internal pressure of the envelope compresses the air passage from inner side so as to achieve a self-closing effect. However, with such nozzle structure, after a period of use, the air will inevitably leak out of the envelope to shorten the using life of the envelope. Therefore, it is necessary to solve the above problem existing in the conventional membrane-type inflation nozzle.

SUMMARY OF THE INVENTION

It is a primary object of the present invention to provide a membrane-type inflation nozzle composed of at least two nozzle membranes defining therebetween an air passage. An adhesive material is disposed on inner wall of at least one of the nozzle membranes at the opening of the nozzle. One end of a release sheet is attached between the membrane walls with the adhesive material and the other end of the release sheet extends out of the opening. When inflating the envelope, the release sheet is first torn away from the nozzle opening. Therefore, an internal pressure of the envelope inward compresses the nozzle membranes and makes the nozzle self-close. In addition, the adhesive material at the nozzle opening is able to adhere corresponding inner membrane walls to each other so as to achieve a more tightly air-sealing effect.

The present invention can be best understood through the following description and accompanying drawings, wherein:

BRIEF DESCRIPTION OF THE DRAWINGS

FIG. 2-1 is a sectional view of the nozzle of the present invention;

FIG. 2—2 is a sectional view showing that the inner walls of the nozzle membranes are adhered to each other;

FIG. 4-1 is a sectional view of the nozzle of FIG. 3;

FIG. 4-2 is a sectional view of the nozzle of FIG. 3, showing that the nozzle membrane is folded to wrap the other nozzle membrane;

DETAILED DESCRIPTION OF THE PREFERRED EMBODIMENTS

Figure 1:
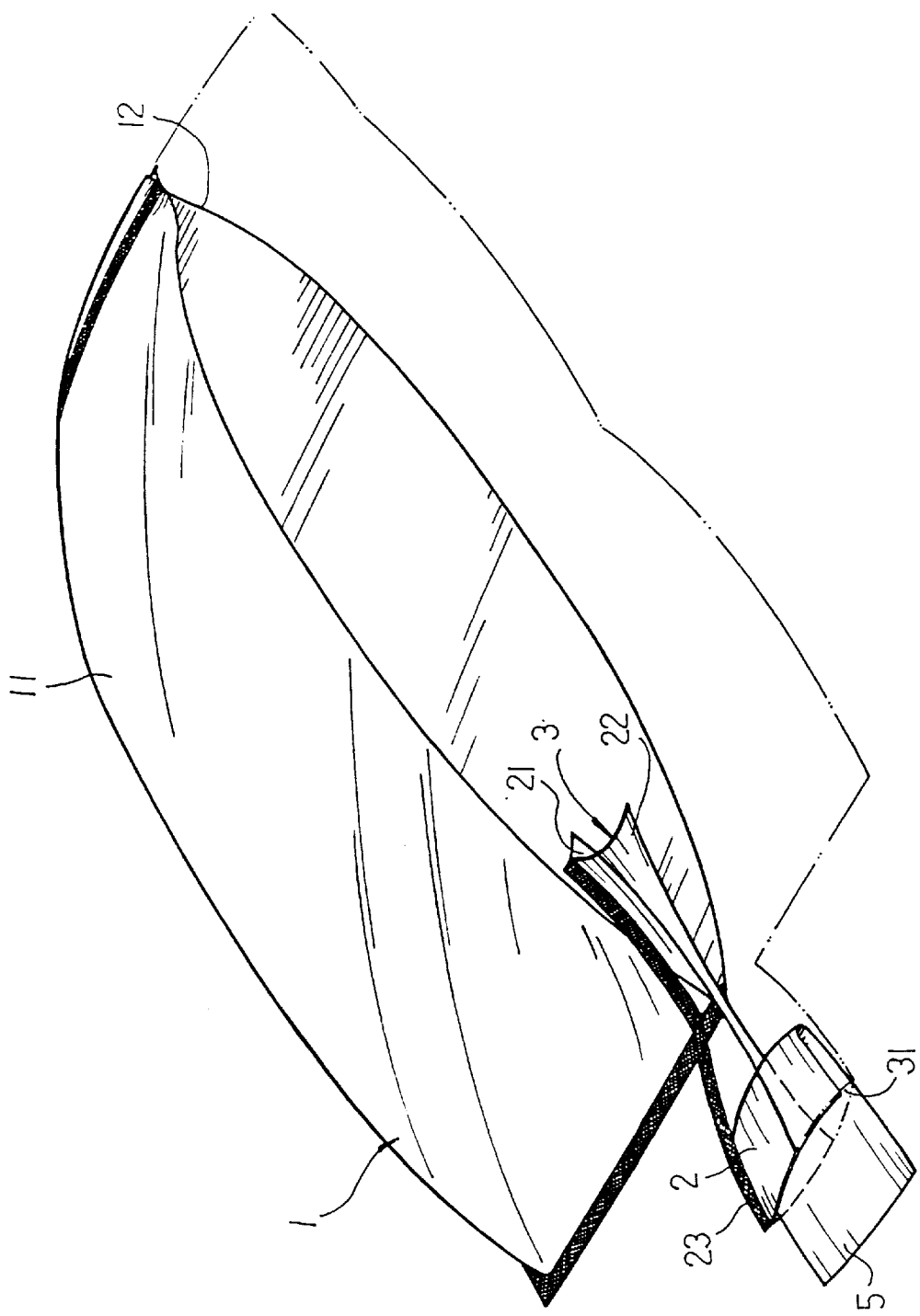
FIG. 1 is a perspective sectional view of a preferred embodiment of the present invention.
Figures 1, 2:
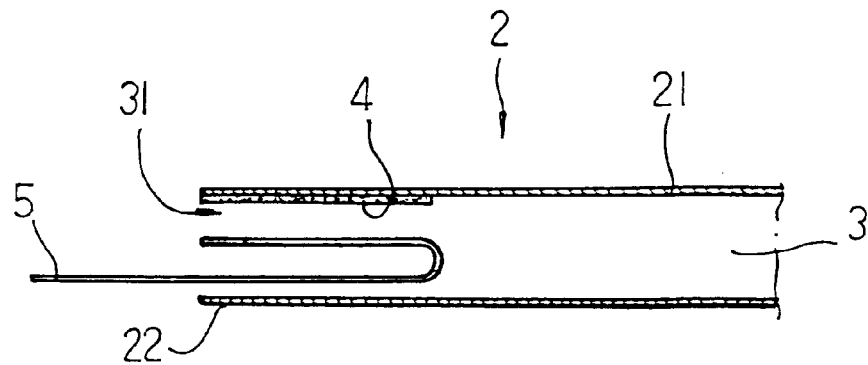
Figure 2:
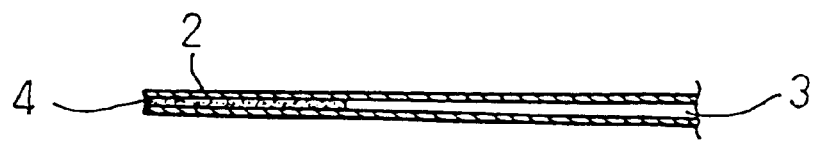

Please refer to FIGS. 1 and 2. The inflation nozzle 2 of the present invention is applicable to an inflatable envelope 1 which is formed by two envelope membranes 11, 12. The peripheries of the membranes 11, 12 are seamed to form the envelope 1. At least one portion of the edge of the envelope is formed with a membrane-type inflation nozzle 2 between the two envelope membranes 11, 12. The inflation nozzle 2 inward extends from the edge of the envelope and is formed by at least two nozzle membranes 21, 22 overlaid on each other. At least one portion of two lateral edges of the nozzle membranes 21, 22 is formed with corresponding seam lines 23, 24 extending inward from the edge of the envelope so as to define an air passage 3 communicating the interior of the envelope with the outer side. An outer end of the gas passage 3 is formed with an opening 31. In the nozzle opening 31, at least one nozzle membrane 21 (or 22) is disposed with an adhesive material 4 to which a release sheet 5 is attached. One end of the release sheet 5 is attached to the inner membrane wall of the opening 31 with the adhesive material 4 and adhered to the inner membrane wall of the nozzle 2. The other end of the release sheet 5 extends out of the opening 31. The release sheet 5 can directly extend out of the opening 31 or first extend toward the interior of the opening 31 by a certain length and then bend and extend to the outer side of the opening 31 by a certain length. After the envelope 1 is inflated via the nozzle 2, the pressure in the envelope can make the nozzle 2 self-close. In addition, the release sheet 5 can be torn away, so that the opposite membrane inner walls of the nozzle 2 can adhere to each other by means of the adhesive material 4 at the opening 31. Therefore, a more tightly sealing effect is achieved.

Figures 1, 4:
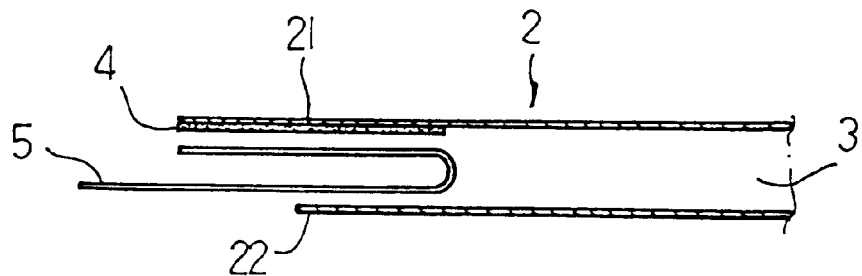
Figures 2, 4:
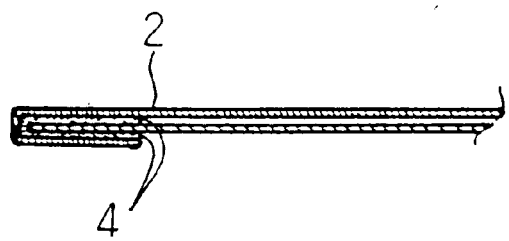
Figure 3:
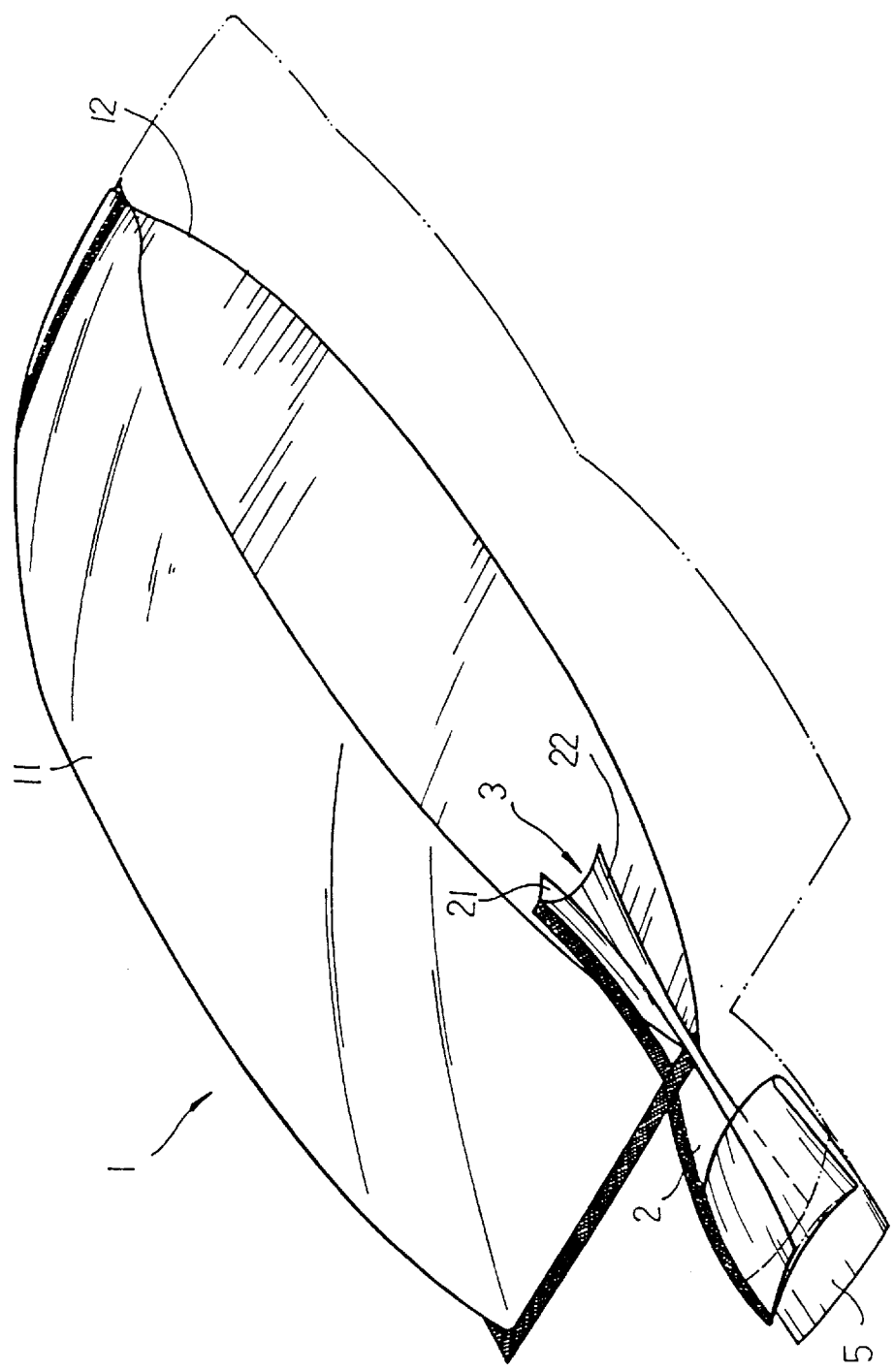
FIG. 3 is a perspective sectional view of another embodiment of the present invention.

Please refer to FIGS. 3 and 4. According to another embodiment of the present invention, one of the nozzle membranes 21 of the nozzle 2 is elongated and disposed with an adhesive material 4. A release sheet 5 is detachably attached to the adhesive material 4. After the release sheet 5 is torn away, the elongated nozzle membrane 21 can be reversely folded and adhered to the outer side of the shorter nozzle membrane 22 so as to achieve a further sealing effect.

Figure 5:
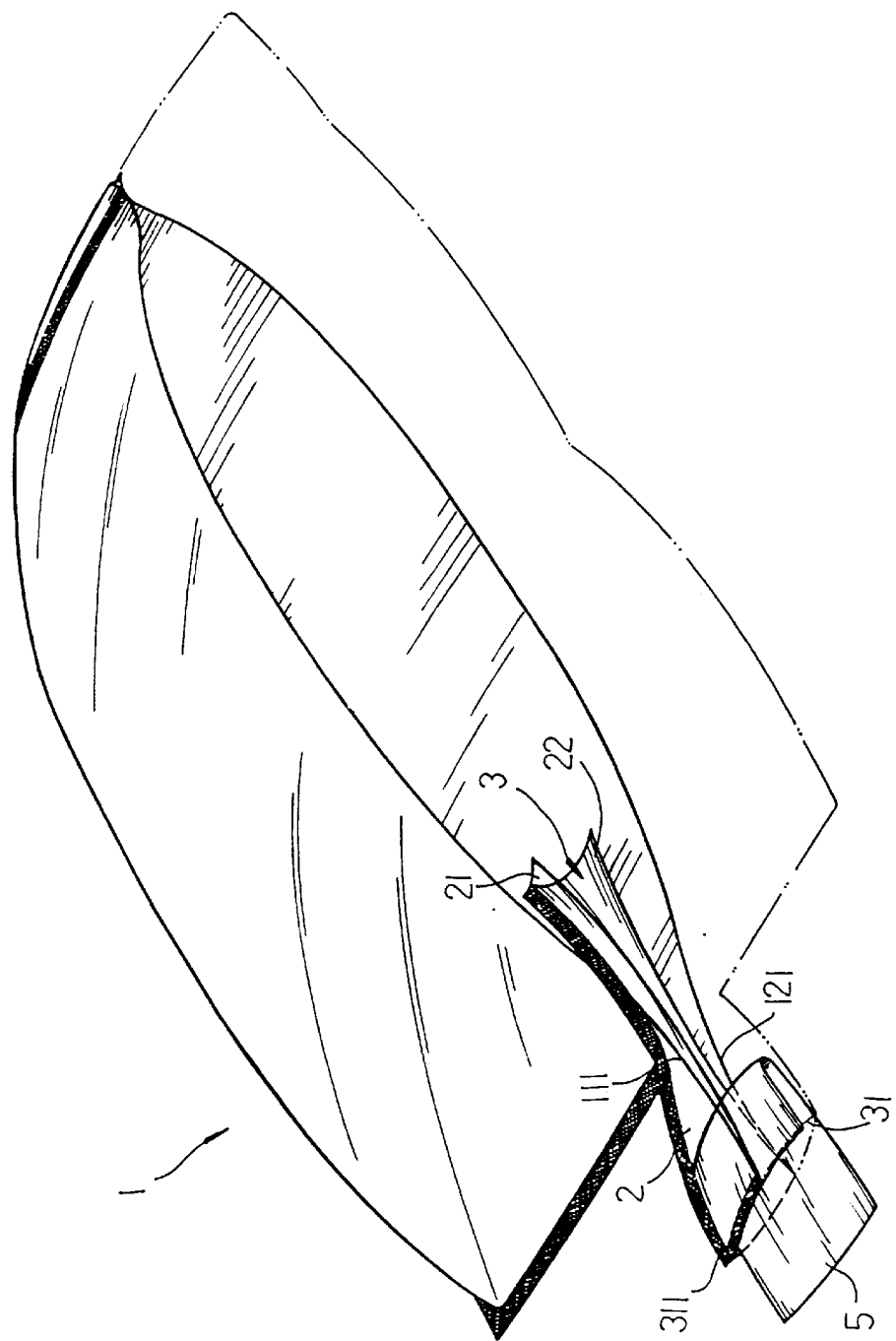
FIG. 5 is a perspective sectional view of still another embodiment of the present invention.
Figure 6:
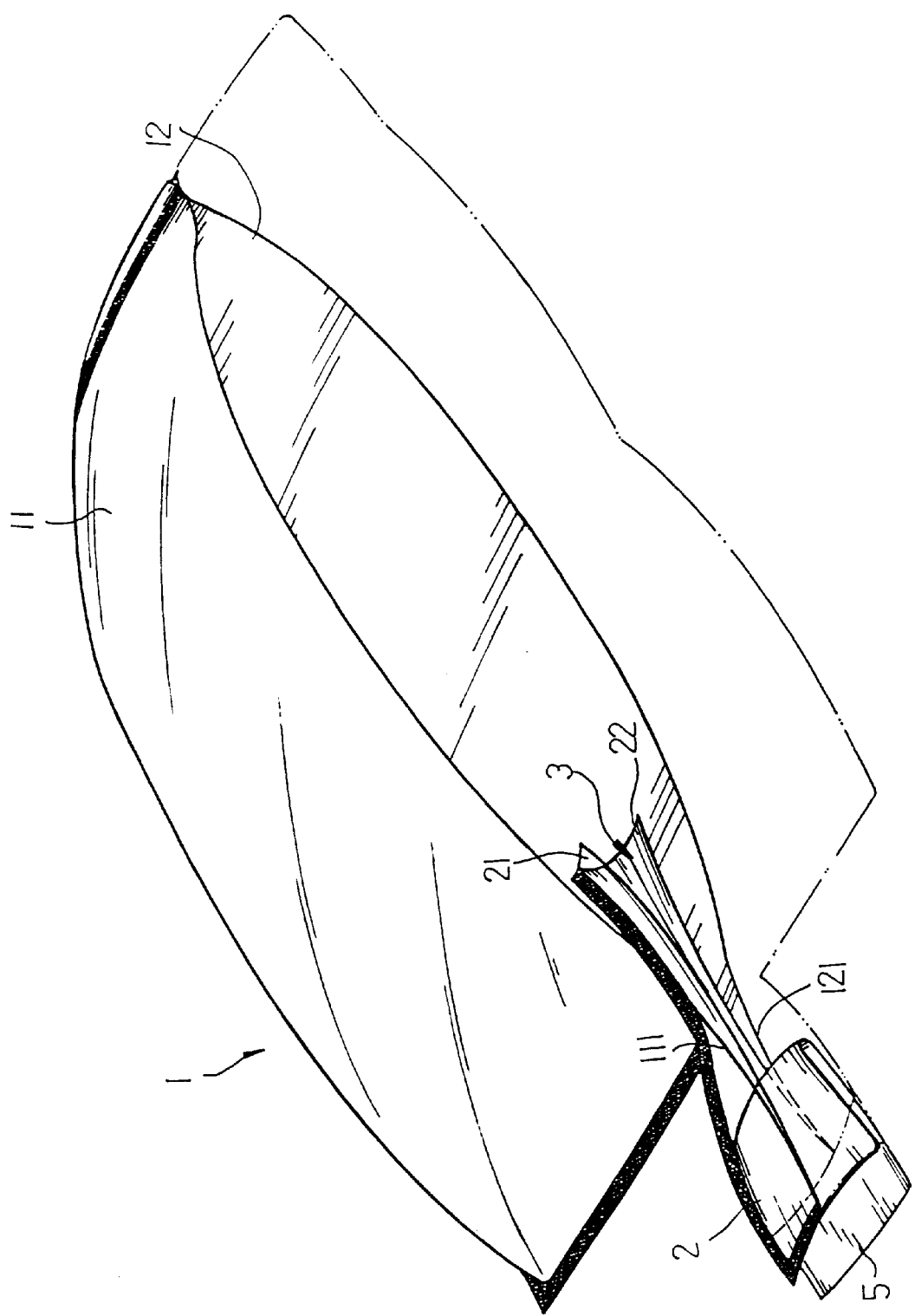
FIG. 6 is a perspective sectional view of still another embodiment of the present invention.

Referring to FIG. 5, the membranes 111, 121 of the envelope 1 corresponding to the nozzle 2 are outward elongated in accordance with the pattern of the nozzle 2. Moreover, the lateral edges of the elongated portions are seamed with the lateral edges of the nozzle membranes 21, 22 and are opened only toward the interior of the envelope to define an outward extending envelope 1. Accordingly, after inflated, the air in the envelope will be filled in the outward extending portion to further compress the portion with the adhesive material 4 so as to more tightly seal the same. FIG. 6 shows another aspect of the outward extending envelope 1 with a different length, in which one envelope can be folded to wrap the other.

Figure 7:
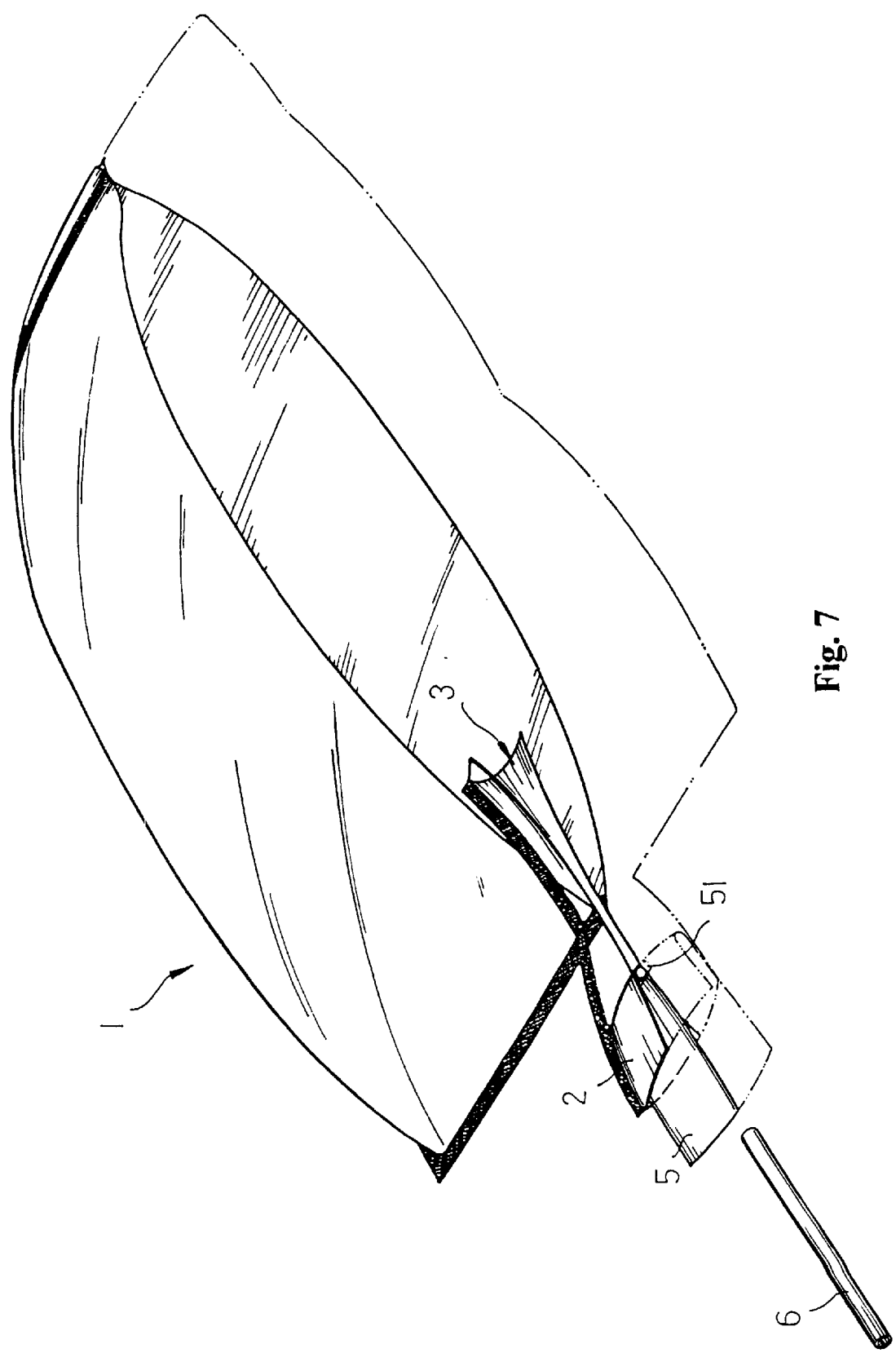
FIG. 7 is a perspective sectional view of another embodiment of the release sheet of the present invention.
Figure 8:
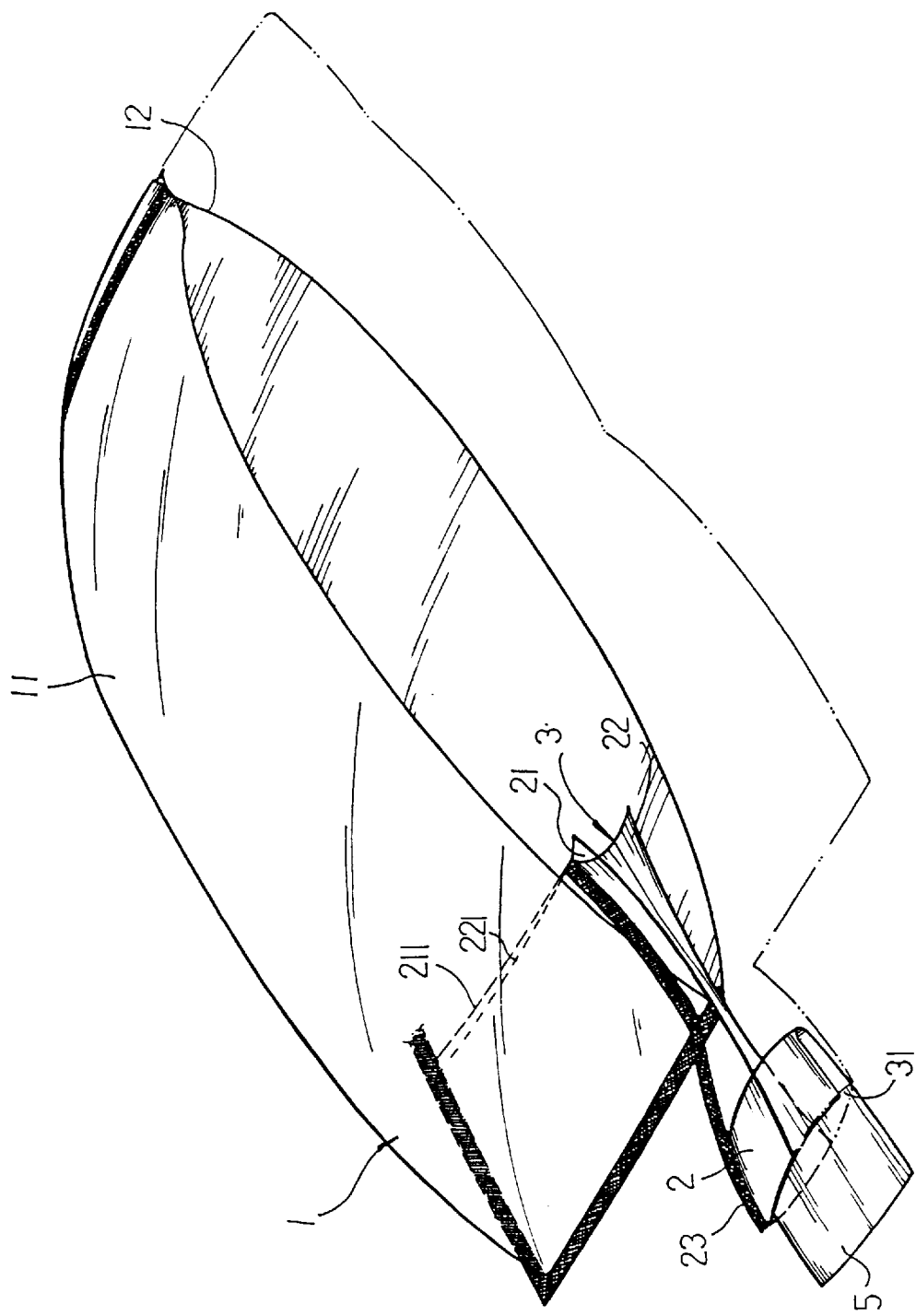
FIGS. 8 to 12 show still another embodiment of the nozzle of the present invention.
Figure 9:
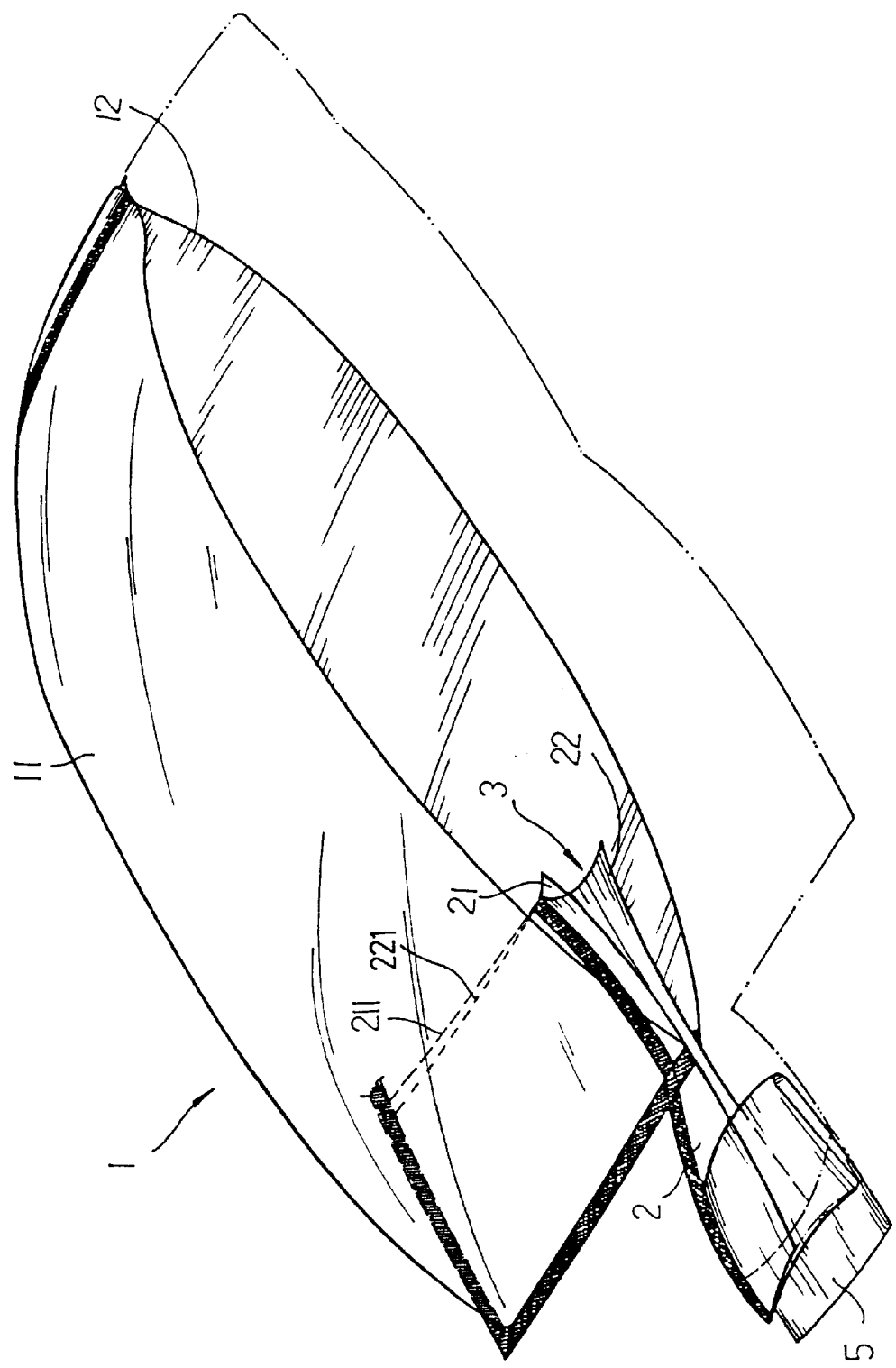
Figure 10:
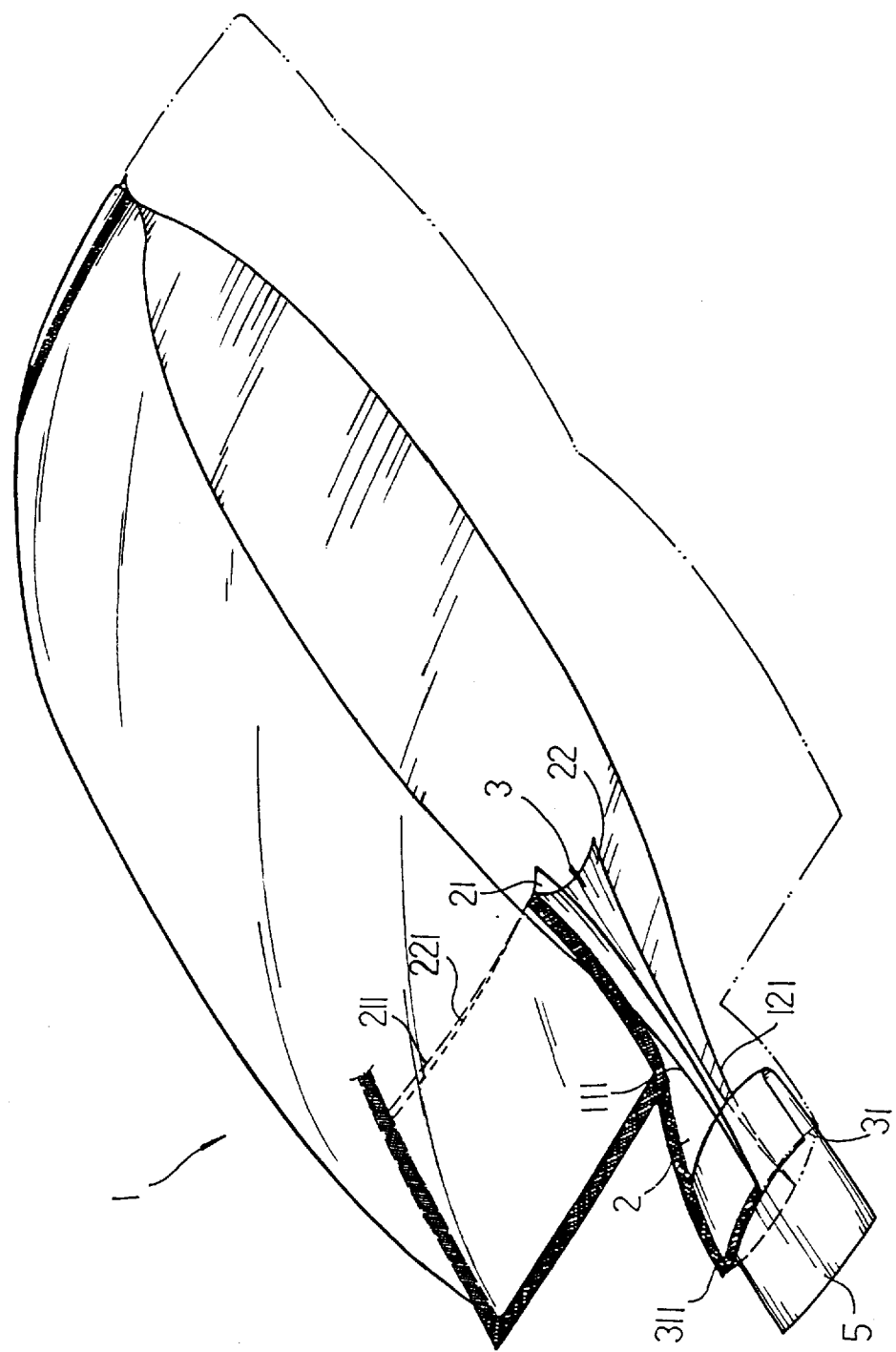
Figure 11:
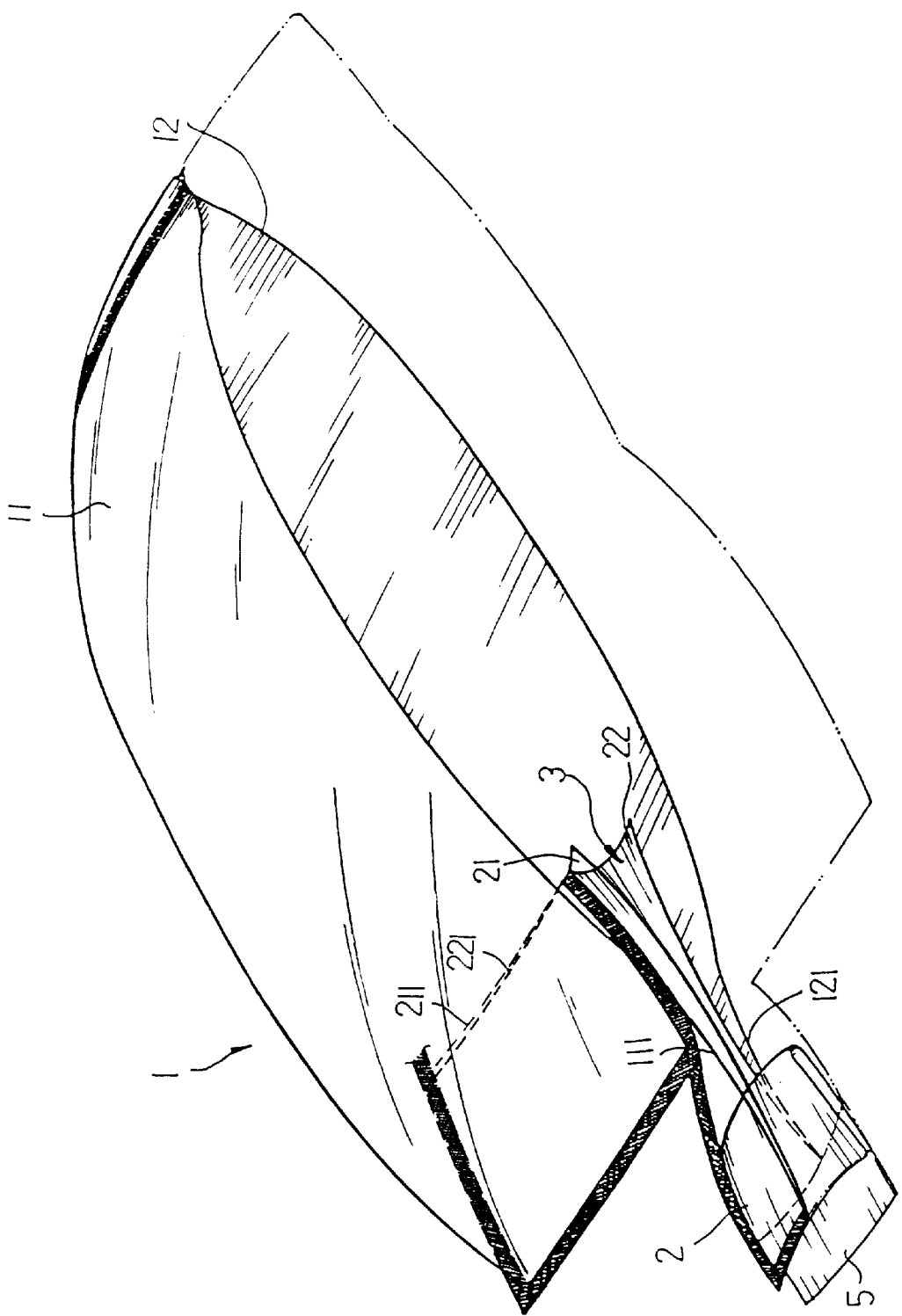
Figure 12:
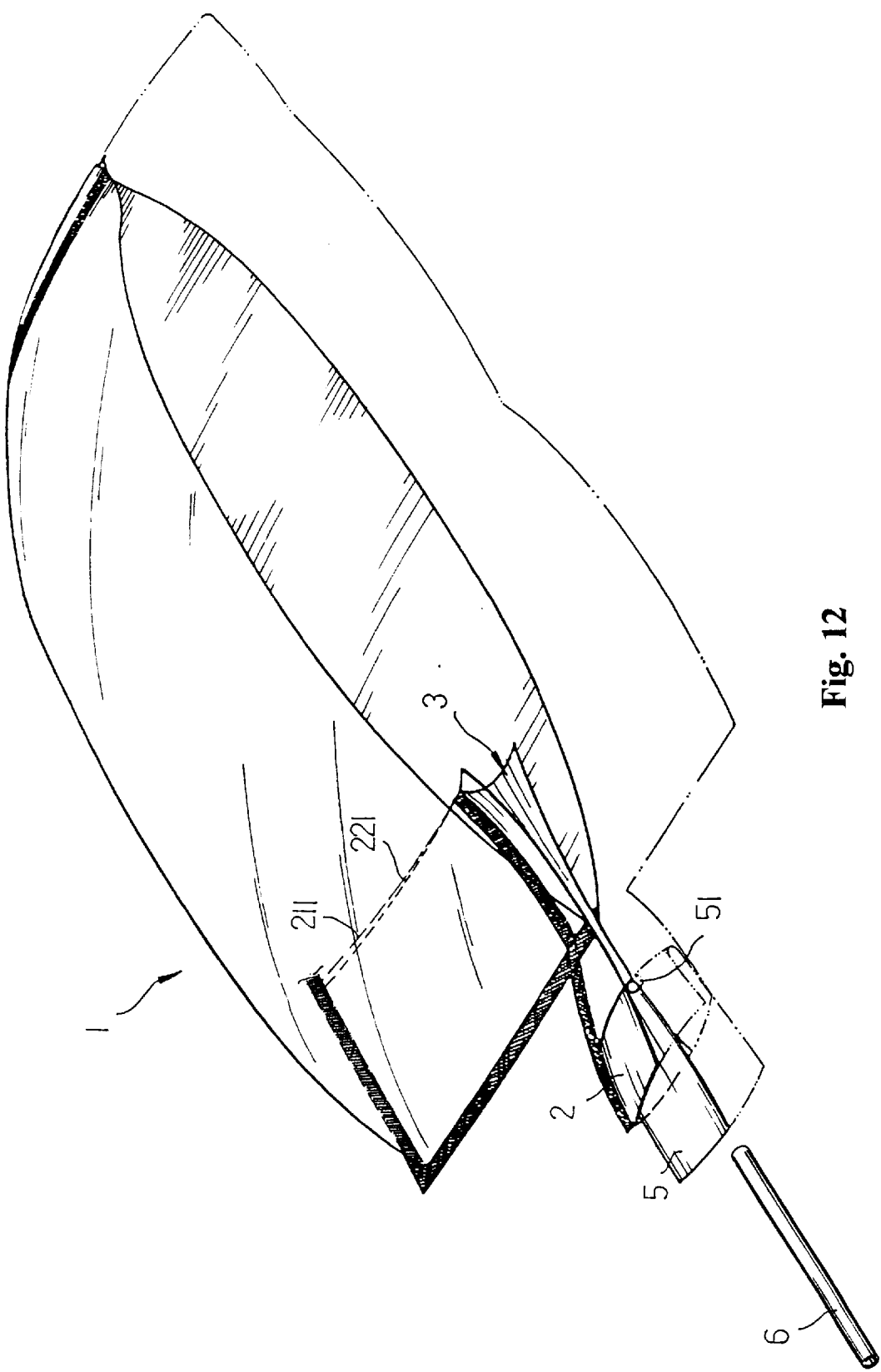

FIG. 7 shows still another embodiment of the present invention, in which the release sheet 5 is attached to the inner side of the opening 31 of the envelope 1. In the case that the two inner membrane walls at the opening 31 of the nozzle 2 are both disposed with the adhesive material 4, the inward bending portion of the release sheet 5 or a proper portion is formed with a through hole 51. When the envelope 1 is inflated, it is unnecessary to first tear away the release sheet 5 and a tube body 6 can be inserted into the opening 31 through the through hole 51 of the release sheet 5 and extended into the air passage 3. Therefore, the envelope 1 can be easily fully inflated. Then the tube body 6 is extracted and the release sheet 5 is torn away. Then the nozzle membranes corresponding to the opening 31 are adhered to each other by the adhesive material 4 so as to achieve a more tightly air-sealing effect.

In addition, the opening 31 is disposed with the release sheet 5. In manufacturing of the seam line 311 of outer end of the opening 31, this provides a great convenience. The steps of spraying isolating oil or thermally pressing for fusing and clamping an isolating plate can omitted so as to increase the processing efficiency and maintain quality of the product.

FIGS. 8 to 12 show still another embodiment of the present invention. At least two nozzle membranes 21, 22 are positioned between the two envelope membranes 11, 12 and fused inward from the edges by high frequency or other measures to define an air passage 3 and an opening 31 of the nozzle 2. The two lateral membranes of the air passage 3 are the inward extending membranes 23. Furthermore, the outer peripheries of the envelope membranes 11, 12 are fused with the overlaid lateral ends 211, 221 of the nozzle membranes 21, 22 to form another type of nozzle 2 of the inflatable envelope 1. The adhesive material 4 and the release sheet 5 in the opening 31 are identical to the above embodiments and will not be further described.

It should be noted that the above description and accompanying drawings are only used to illustrate some embodiments of the present invention, not intended to limit the scope thereof. Any modification of the embodiments should fall within the scope of the present invention.

What is claimed is:

1. A membrane-type inflation nozzle composed of at least two nozzle membranes overlaid on each other, at a part of two lateral edges of the two nozzle membranes being longitudinally seamed to form a seam line so as to define at least one air passage between the two nozzle membranes communicating an inner side with an outer side, an inner wall of at least one nozzle membrane at an open end of the air passage being disposed with adhesive material on which a release sheet is attached, whereby the nozzle is applicable to an inflatable envelope, serving as inflation nozzle, after the envelope is inflated, an internal pressure making the nozzle self-close, the release sheet being torn away, whereby the adhesive material at the open end is able to adhere corresponding inner walls of the nozzle membranes adjacent to the open end to each other so as to achieve a more tightly sealing effect.

2. An inflation nozzle as claimed in claim 1, wherein one of the nozzle membranes with the adhesive material is elongated and a release sheet is attached to the adhesive material, whereby after the release sheet is torn away, the elongated nozzle membrane can be reversely folded to attach to outer side of the shorter nozzle membrane so as to achieve a further sealing effect.

3. An inflation nozzle as claimed in claim 1, wherein one end of the release sheet is attached to a nozzle membrane on one side with the adhesive material and extends toward inner end of the nozzle by a certain length and then is reversely folded to outer side of the nozzle.

4. An inflation nozzle as claimed in claim 2, wherein one end of the release sheet is attached to a nozzle membrane on one side with the adhesive material and extends toward inner end of the nozzle by a certain length and then is reversely folded to outer side of the nozzle.

5. An inflation nozzle as claimed in claim 3, wherein two inner membrane walls at the open end of the nozzle are both disposed with adhesive material and an inward bending portion or a portion adjacent thereto of the release sheet is formed with a through hole, whereby when inflating the envelope, it is unnecessary to first tear away the release sheet and the envelope can be inflated through the through hole.

6. An inflation nozzle as claimed in claim 4, wherein two inner membrane walls at the open end of the nozzle are both disposed with adhesive material and an inward bending portion or a portion adjacent thereto of the release sheet is formed with a through hole, whereby when inflating the envelope, it is unnecessary to first tear away the release sheet and the envelope can be inflated through the through hole.

7. An inflation nozzle as claimed in claim 1, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

8. An inflation nozzle as claimed in claim 2, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

9. An inflation nozzle as claimed in claim 3, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

10. An inflation nozzle as claimed in claim 4, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

11. An inflation nozzle as claimed in claim 5, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

12. An inflation nozzle as claimed in claim 6, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

13. An inflation nozzle as claimed in claim 1, wherein at least two nozzle membranes are positioned between the two envelope membranes and fused inward from the edges by high frequency or other measures to define an air passage and an opening of the nozzle, the two lateral membranes of the air passage being the inward extending membranes, furthermore, the outer peripheries of the envelope membranes being fused with the overlaid lateral ends of the nozzle membranes to form another type of nozzle of the inflatable envelope.

14. An inflation nozzle as claimed in claim 13, wherein one of the nozzle membranes with the adhesive material is elongated and a release sheet is attached to the adhesive material, whereby after the release sheet is torn away, the elongated nozzle membrane can be reversely folded to attach to outer side of the shorter nozzle membrane so as to achieve a further sealing effect.

15. An inflation nozzle as claimed in claim 13, wherein one end of the release sheet is attached to a nozzle membrane on one side with the adhesive material and extends toward inner end of the nozzle by a certain length and then is reversely folded to outer side of the nozzle.

16. An inflation nozzle as claimed in claim 14, wherein one end of the release sheet is attached to a nozzle membrane on one side with the adhesive material and extends toward inner end of the nozzle by a certain length and then is reversely folded to outer side of the nozzle.

17. An inflation nozzle as claimed in claim 15, wherein two inner membrane walls at the open end of the nozzle are both disposed with adhesive material and an inward bending portion or a portion adjacent thereto of the release sheet is formed with a through hole, whereby when inflating the envelope, it is unnecessary to first tear away the release sheet and the envelope can be inflated through the through hole.

18. An inflation nozzle as claimed in claim 16, wherein two inner membrane walls at the open end of the nozzle are both disposed with adhesive material and an inward bending portion or a portion adjacent thereto of the release sheet is formed with a through hole, whereby when inflating the envelope, it is unnecessary to first tear away the release sheet and the envelope can be inflated through the through hole.

19. An inflation nozzle as claimed in claim 13, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

20. An inflation nozzle as claimed in claim 14, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

21. An inflation nozzle as claimed in claim 15, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

22. An inflation nozzle as claimed in claim 16, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

23. An inflation nozzle as claimed in claim 17, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

24. An inflation nozzle as claimed in claim 18, wherein the nozzle is disposed on an edge of the inflatable envelope with one end of the nozzle positioned outside the envelope and the other end extending into the envelope at the edge of the envelope adjacent to the nozzle, the upper and lower envelope membranes of the envelope corresponding to outward extending portion of the nozzle being disposed with an outward extending portion, the edge of the outward extending portion being fused with the outward extending portion of the nozzle and only open to the interior of the envelope.

* * * * *